A. G. SATER.
LUGGAGE CARRIER.
APPLICATION FILED DEC. 7, 1917.
1,293,557.
Patented Feb. 4, 1919.
2 SHEETS—SHEET 1.
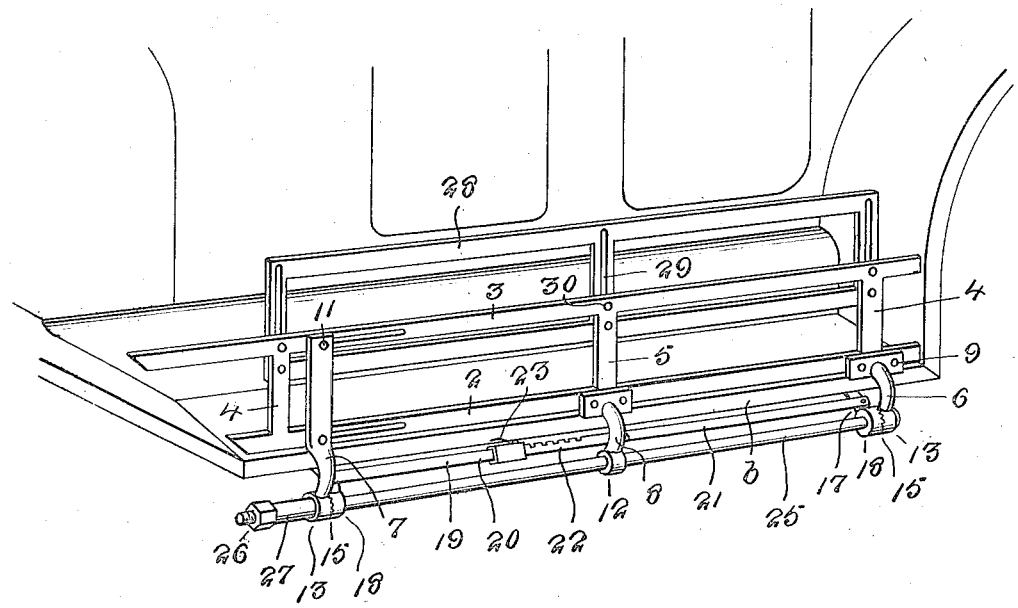
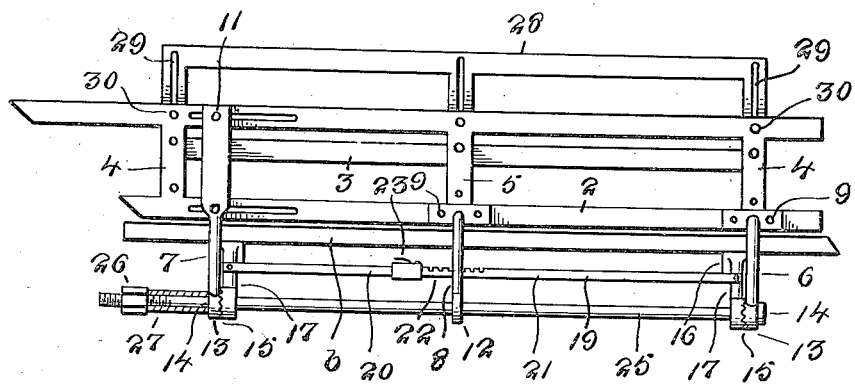
Witnesses
E. R. Ruppert.
J. W. Garner
Inventor
A. G. Sater
By Victor J. Evans
Attorney A. G. SATER.
LUGGAGE CARRIER.
APPLICATION FILED DEC. 7, 1917.
1,293,557.
Patented Feb. 4, 1919.
2 SHEETS—SHEET 2.
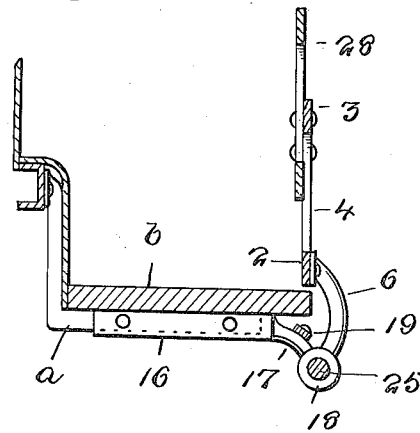
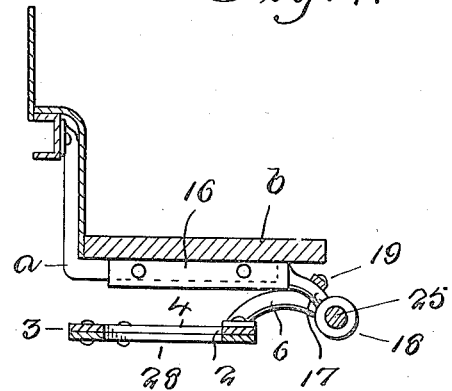
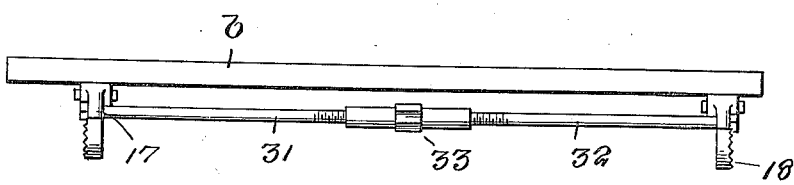
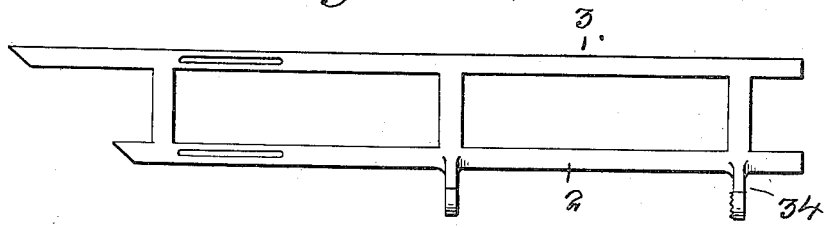
Witnesses
E. R. Ruppert
JW Garner
Inventor
A. G. Sater
By Victor J. Evans
Attorney

UNITED STATES PATENT OFFICE.

ARCHIE G. SATER, OF ENID, OKLAHOMA.

LUGGAGE-CARRIER.

1,293,557. Specification of Letters Patent. Patented Feb. 4, 1919.

Application filed December 7, 1917. Serial No. 206,051.

*To all whom it may concern:*

Be it known that I, ARCHIE G. SATER, a citizen of the United States, residing at Enid, in the county of Garfield and State of Oklahoma, have invented new and useful Improvements in Luggage-Carriers, of which the following is a specification.

This invention is an improved luggage carrier for attachment to the running-board of an automobile and for use thereon in carrying suit cases, luggage, trunks or the like, the object of the invention being to provide an improved device of this character which is simple in construction, which can be readily attached to the running-board of an automobile or removed therefrom, which can be used for carrying either small or large luggage and which can also be adjusted according to the character of the luggage.

The invention consists in the construction, combination and arrangement of devices hereinafter described and claimed.

In the accompanying drawings:—

Figure 1 is a perspective view of a luggage carrier constructed and arranged in accordance with my invention, showing the same installed and arranged for use on the running-board of an automobile.

Fig. 2 is a detailed side elevation of the same, partly in section.

Fig. 3 is a transverse sectional view of the same.

Figs. 4 and 5 are detailed views.

Fig. 6 is a detailed elevation, showing a modified construction.

Fig. 7 is a detail elevation of the frame.

In the embodiment of my invention I provide a frame or carrier 1 which is here shown as comprising a lower bar 2, an upper bar 3, vertical end bars 4 and a vertical intermediate bar 5. Preferably the frame is made of a single piece of material and the same may be a casting. The frame is also provided with end arms 6, 7 and an intermediate arm 8. The arms 6 and 8 are fixed and are here shown as secured to the lower bar 2 of the frame by screws or bolts 9. The bar 7 extends across the frame and is longitudinally adjustable thereon, the bars 2, 3 of the frame being provided with longitudinal slots in which the bolts 11 which secure the bar 7 operate. The intermediate arm 8 has a bearing opening 12. The arms 6, 7 are each provided with a circular member 13 and a bearing opening 14 at the center of said member. Each member 13 is provided on one side with corrugations 15.

A pair of supporting bars 16 are provided which are longitudinally channeled and which are adapted to be bolted to the end brackets *a* of the automobile running-board *b* at any required distance apart according to the size of the car. Each supporting bar has a curved outer extension 17 which is provided with a circular member 18 which has a central opening, each member 18 being radially corrugated on one side to correspond with the members 13. The said supporting arms 17 are connected together by a rod 19 which comprises a pair of members 20, 21 telescopically fitted together and one provided with rack teeth 22 any one of which may be engaged by a dog 23 with which the other member is provided, so that said rod may be longitudinally adjusted as may be desired. The outer ends of the members of said rod are fixedly secured to said arms 17. The said rod connects and braces the arms 17 and enables the arms to be arranged at any desired distance apart according to the distance between the brackets of the running-board on which the luggage carrier is mounted. Hence the luggage carrier may be fixed on cars of different width.

A pivoting rod 25 passes through the openings in the arms 6, 7 and 8 and the curved extensions of the supporting arm 16 and serves to pivotally mount the frame on said supporting arms so that said frame can be arranged in a vertical position, or folded inwardly under the running-board or extended outwardly therefrom and arranged horizontally and at the level thereof, according to the size and kind of luggage to be carried. The radial corrugations of the circular members 13, 18 interengage and serve to lock the frame in any desired position, the adjusting arm 7 permitting the members 13, 18 to be disengaged and reëngaged in order to effect such adjustment of the frame 1 to be readily made, as will be understood. Said adjusting arm 7 also enables the luggage carrier to be accommodated to the arrangement of the arms 16, according to the distance between said arms and the car on which the luggage carrier is to be mounted. A nut 26 is provided at one end of the pivoted rod 25 to bear against the adjustable member 13 or against one end of a spacer tube 27 which may be used on said rod if required.

I also provide an extension frame 28 for use in connection with the frame 1, for large luggage and which extension frame is arranged on the inner side of the frame 1 and is provided with slots 29. The bolts 30 which secure the extension frame to the frame 1 operate in said slots and hence said extension frame may be adjusted as may be desired and may be secured in any desired adjusted position.

The brace rod may be modified as shown in Fig. 5 and when so constructed comprises a pair of members 31, 32 which are connected together by a turn-buckle 33. Hence such modified form of the brace rod may be adjusted longitudinally, as will be understood.

In Fig. 6 I show another modified construction in which the arms of the frame are cast integral therewith as at 34. My improved luggage carrier may be readily attached to or removed from an automobile running-board, may be arranged compactly out of the way when not in use and may be adjusted to accommodate itself to the size and kind of luggage so that either small luggage or a trunk or the like may be carried as may be required. Moreover my improved luggage carrier is simple in construction, is light, and may be readily manufactured at small cost.

While I have herein shown and described a preferred form of my invention, I would have it understood that changes may be made in the form, proportions and construction of the several parts without departing from the spirit of my invention and within the scope of the appended claims.

Having thus described my invention, I claim:—

1. An automobile luggage carrier comprising supporting arms adapted to be attached to a running board, a frame having arms one of which is longitudinally adjustable on said frame, a pivoting rod extending through openings with which supporting arms and frame arms are provided, so that the frame is pivotally mounted on the supporting arms and may be turned to a vertical, a horizontal or an inclined position, one of said supporting arms and the said adjustable frame arm being provided with co-engaging locking means to secure the frame in either of such positions, and means to secure the longitudinally adjustable arm against casual movement.

2. An automobile luggage carrier comprising supporting arms adapted to be secured to a running board, a frame having arms one of which is longitudinally adjustable of said frame, the said supporting arms and frame arms being pivotally connected together and a longitudinally extensible brace rod connecting the said supporting arms.

In testimony whereof I affix my signature.

ARCHIE G. SATER.